June 2, 1936.  A. B. GARDELLA  2,042,985
TWEEZERS
Filed Aug. 22, 1934

INVENTOR
ALBERT B. GARDELLA
BY Brockett, Hyde, Higley & Meyer
ATTORNEYS

Patented June 2, 1936

2,042,985

UNITED STATES PATENT OFFICE 2,042,985

TWEEZERS

Albert B. Gardella, Cleveland, Ohio

Application August 22, 1934, Serial No. 740,909

2 Claims. (Cl. 128—354)

This invention relates to improvements in tweezers, such as are used for removing hairs and the like, the invention having for its general object the provision of tweezers which are of simple and inexpensive construction, of neat and pleasing appearance, of proper size, shape and weight for convenient manipulation and use, and of strong and sturdy character.

A more specific object of the present invention is the provision of tweezers having normally open jaws, the normal tendency of which is to assume such open relationship, and having simple and improved manually-operable means for not only effecting closing of said jaws but also, for automatically effecting a locking thereof in such closed relationship.

A further specific object of the present invention is the provision of tweezers in which said manually-operable means is selectively movable in either one of two opposite directions to effect closing of the tweezer jaws, the movement of said means in one of said directions also automatically effecting a locking of said jaws in such closed relationship.

With the foregoing and other objects in view, which will appear as the description of the invention proceeds, the invention resides in the combination and arrangement of parts and in the details of construction hereinafter described and claimed, it being understood that changes in the invention as herein disclosed can be made within the scope of what is claimed without departing from the spirit of the invention.

Figure 1:
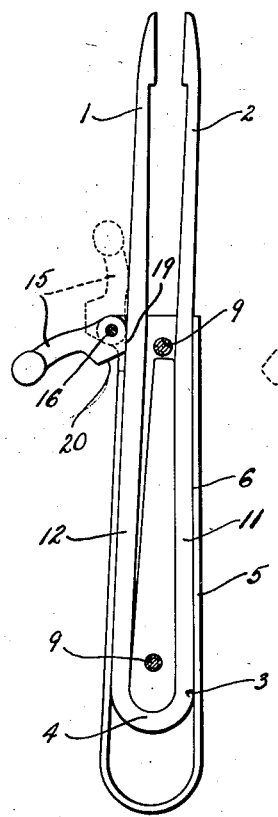
Figure 2:
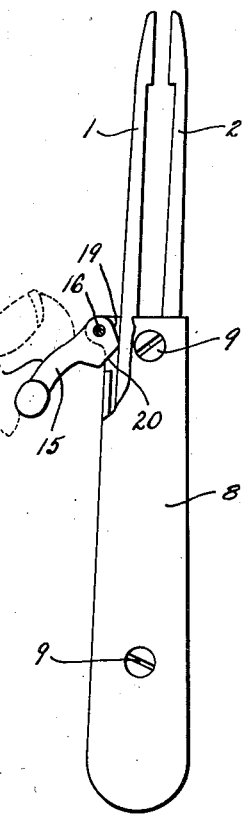
Figure 3:
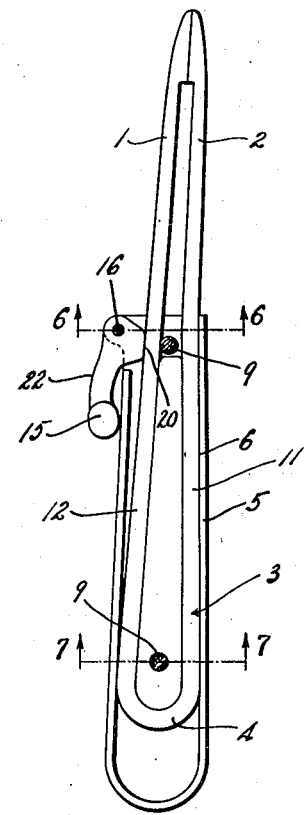
Figure 4:
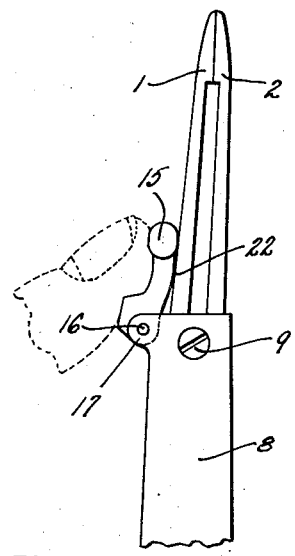
Figure 5:
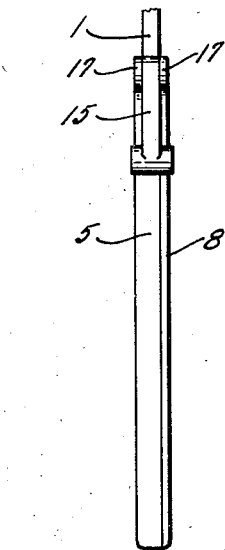
Figure 6:
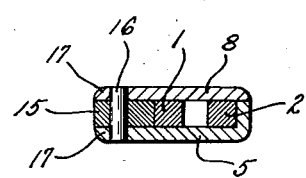
Figure 7:
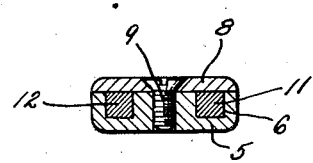

The invention will be readily understood from the following description of one embodiment thereof, reference being had to the accompanying drawing in which Fig. 1 is a plan view of the present improved tweezers, the cover part of the casing thereof being removed and the tweezer jaws being in their normally open position; Fig. 2 is a similar view of said tweezers, with the cover part of the casing in place and with the manually-operable means in partly operated position to effect a partial closing of the tweezer jaws; Fig. 3 is a view similar to Fig. 1 but with the tweezer jaws automatically locked in closed position as the result of complete operation of the manually-operable means in one direction; Fig. 4 is a view similar to Fig. 2 but showing the tweezer jaws in closed but unlocked position as the result of movement of the manually-operable means in the opposite direction; Fig. 5 is a side view of the tweezers in the condition shown in Fig. 3, except that the cover part of the casing is in place; and Figs. 6 and 7 are cross-sectional views of the tweezers on the lines 6—6 and 7—7, Fig. 3, respectively, the cover part of the casing being in place.

As indicated in said drawing, the present improved tweezers include a pair of normally open, cooperating jaws 1 and 2, said jaws comprising the end portions of a one-piece spring metal member 3 bent intermediate its ends, as at 4, into substantially U-shape, the resiliency of the metal of said member causing the jaws thereof to normally assume such open relationship.

The intermediate portion of said spring metal member 3 is enclosed in a suitable casing of metal, hard rubber or the like, the casing here shown comprising a main part 5, provided with a generally U-shaped groove 6 to receive said intermediate portion of said spring metal member, and a cover part 8 removably or otherwise suitably secured by screws 9 or the like to said main part 5.

As clearly shown in Figs. 1 and 3, the right-hand side of the casing groove 6 is of such limited width that the corresponding side 11 of the intermediate portion of the spring metal member 3 is immovably held therein, with consequent immovability of the right-hand jaw 2 relative to the casing. The left-hand side of said casing groove 6, however, is of increasing width from its inner end to its outer end, with the result that the left-hand side 12 of the intermediate portion of said spring metal member has sufficient lateral movement therein to enable the left-hand jaw 1 to move laterally into and out of engagement with the right-hand jaw 2, engagement or closed relationship of said jaws being shown in Figs. 3 and 4, and disengagement or open relationship thereof being shown in Figs. 1 and 2.

As heretofore mentioned and as indicated in Fig. 1, the tweezer jaws 1 and 2 are normally open, the resiliency of the metal of which they are made causing them to normally assume such open relationship.

For closing said jaws, a single thumb-operable lever 15 is provided, said lever being pivotally mounted at one end on a pin 16 carried by a pair of ears 17 with which the two parts 5, 8 of the casing are integrally or otherwise suitably provided adjacent their upper ends.

To close said jaws by the operation of said lever, said lever may be thumb-pressed or operated in either one of two opposite directions, namely, in a counter-clockwise direction, as in Fig. 2, and in a clockwise direction, as in Fig. 4. If turned in a counter-clockwise direction, said lever not only effects a closing of said jaws, as the result of the engagement of its shoulder 19 with the laterally movable, left-hand side 12 of the intermediate portion of the spring metal member 3, but also effects an automatic locking of them in such closed relationship, as the result of the engagement of its shoulder 20 with said left-hand side 12 of said spring metal member. In Fig. 3, the tweezer jaws are shown in such locked engagement, subject to release, when desired, by simple clockwise movement of said lever.

If said lever is turned in a clockwise direction, as in Fig. 4, a closing of said jaws is effected as the result of the engagement of the shoulder 22 of said lever with said laterally movable left-hand side 12 of the spring metal member 3, but such closed relationship of said jaws is maintained only so long as said lever is manually held in the jaw-closing position shown in Fig. 4.

It will thus be apparent that the tweezer jaws 1, 2 may be closed by swinging the lever 15 in either one of two opposite directions, the movement of said lever in a clockwise direction effecting a mere closing of said jaws, but not a locking thereof, and the movement of said lever in a counter-clockwise direction effecting not only a closing of said jaws but also, an automatic locking thereof in such closed relationship.

Further features and advantages of the present tweezers will be apparent to those skilled in the art to which they relate.

Having described my invention, I claim:

1. The herein described tweezers, comprising a pair of jaw portions each having a body part and a jaw part, said jaw parts being in normally separated relationship, an enclosing casing for said body parts, said casing being provided with means for preventing lateral movement of one of said jaw portions relative to said casing, and a lever pivotally mounted on said casing for laterally moving said other jaw portion relative to said casing to effect engagement of said jaw parts and for releasably locking said jaw parts in such engaged relationship.

2. The herein described tweezers, comprising a pair of jaw portions each having a body part and a jaw part, each of said jaw parts having a gripping surface adjacent the free end thereof, said gripping surfaces being normally in separated relationship, and an enclosing casing for said body parts, and a lever pivotally mounted on said casing for movement in one direction to one position to effect engagement only of said gripping surfaces and for movement in an opposite direction to a second position to not only effect engagement of said jaw surfaces but to also releasably lock them in such engaged relationship, said lever being spaced an appreciable distance from said gripping surfaces when in either of said positions.

ALBERT B. GARDELLA.